April 12, 1938. A. S. HOWELL 2,114,187
PHOTOGRAPHIC STRIP
Filed Nov. 28, 1934
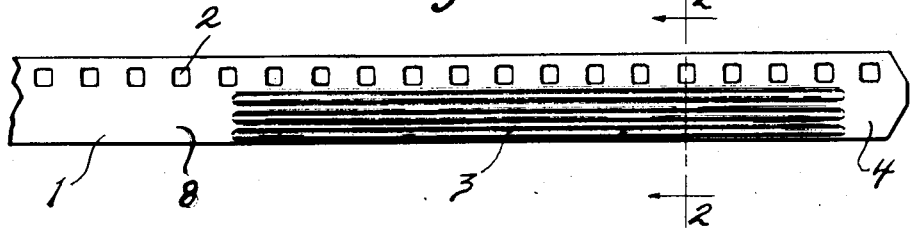
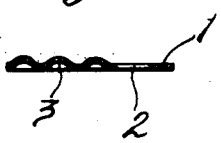
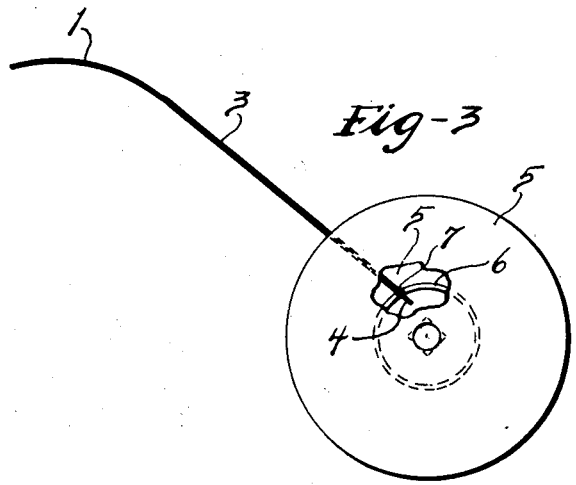
Inventor
Albert S. Howell
By Robert F. Miehle Jr.
Atty.

Patented Apr. 12, 1938

2,114,187

UNITED STATES PATENT OFFICE 2,114,187

PHOTOGRAPHIC STRIP

Albert S. Howell, Chicago, Ill., assignor to The Bell & Howell Company, Chicago, Ill., a corporation of Illinois Application November 28, 1934, Serial No. 755,196

2 Claims. (Cl. 95—9)

My invention relates particularly to a motion picture film strip although not limited to this use alone.

The object of the invention resides in the provision of a photographic strip which is easily and conveniently engaged with the hub of a flanged reel for the rolling of the strip thereon, the invention having particular reference to the extremely narrow motion picture film strips now being used, the flanged reels upon which such film is wound being too narrow for the insertion of a person's fingers between the flanges thereof for the engagement of the film end with the hub of the reel.

The invention will be better understood by reference to the accompanying drawing in which—

Figure 1 is an enlarged face view of a motion picture film embodying my invention;

Figure 2 is an enlarged section of the same taken on the line 2—2 of Figure 1; and Figure 3 is a side elevation of a flanged reel with the film of my invention inserted therein, a portion of a flange of the reel being broken away.

Referring to the drawing, a motion picture film strip is designated at 1, and has its main longitudinal portion flat and is provided with a usual longitudinally extending perforated portion 2 adjacent one side thereof and a usual longitudinally extending photographic record portion 8 alongside said perforated portion. In accordance with my invention the film strip 1 is provided with a longitudinally deformed or corrugated portion 3 of relatively short longitudinal extent and disposed in the region of one end of the film strip and interrupting the photographic record portion 8, and the corresponding end of the film strip, designated at 4, is flat. See Figures 1 and 2.

Referring to Figure 3, a reel for the winding of the film strip consists of spaced flanges 5 and a hub 6 extending therebetween and provided with a slot 7 for the reception of the film end to wind the film on the reel.

The deformation or corrugation 3 of the end portion of the film strip stiffens it against facewise bending so that the film is conveniently inserted between the flanges of the reel and the flat extreme end portion 4 of the film engaged in the slot of the reel hub preparatory to winding the film on the reel, the deformed or corrugated portion 3 bending under the winding stress to wind about the hub 6.

Having thus described my invention, I do not wish to be limited to the precise details described as changes may be readily made without departing from the spirit of my invention, but having thus described my invention, I claim as new and desire to secure by Letters Patent the following:

1. A photographic film strip having the main longitudinal portion thereof flat and provided with a longitudinally corrugated portion of relatively short longitudinal extent disposed in the region of one end thereof and having the corresponding end thereof flat.

2. A photographic film strip having the main longitudinal portion thereof flat and having a longitudinally extending perforated portion and a longitudinally extended photographic record portion alongside said perforated portion, and provided with a longitudinally corrugated portion of relatively short longitudinal extent disposed in the region of one end thereof and interrupting said photographic record portion and having the corresponding end thereof flat.

ALBERT S. HOWELL.